United States Patent
Funabashi et al.

(10) Patent No.: US 12,124,252 B2
(45) Date of Patent: Oct. 22, 2024

(54) SERVER, METHOD, AND SYSTEM FOR PROVIDING MAINTENANCE MANAGEMENT SERVICE FOR INDUSTRIAL MACHINE TO CLIENT COMPUTER

(71) Applicant: KOMATSU INDUSTRIES CORPORATION, Kanazawa (JP)

(72) Inventors: Kouji Funabashi, Ishikawa (JP); Yusuke Masato, Ishikawa (JP); Taketoshi Fukumura, Ishikawa (JP); Eiji Doba, Ishikawa (JP)

(73) Assignee: KOMATSU INDUSTRIES CORPORATION, Ishikawa (JP)

( * ) Notice: Subject to any disclaimer, the term of this patent is extended or adjusted under 35 U.S.C. 154(b) by 649 days.

(21) Appl. No.: 17/293,408

(22) PCT Filed: Dec. 17, 2019

(86) PCT No.: PCT/JP2019/049434
§ 371 (c)(1),
(2) Date: May 12, 2021

(87) PCT Pub. No.: WO2020/174829
PCT Pub. Date: Sep. 3, 2020

(65) Prior Publication Data
US 2022/0011765 A1    Jan. 13, 2022

(30) Foreign Application Priority Data
Feb. 28, 2019   (JP) ................................. 2019-035973

(51) Int. Cl.
G05B 23/02 (2006.01)
G06Q 10/20 (2023.01)

(52) U.S. Cl.
CPC ......... *G05B 23/0283* (2013.01); *G06Q 10/20* (2013.01)

(58) Field of Classification Search
CPC ...... G05B 23/0283; Y02P 90/80; G06Q 10/20
(Continued)

(56) References Cited

U.S. PATENT DOCUMENTS

| 6,587,812 B1 | 7/2003 | Takayama |
| 8,781,982 B1 * | 7/2014 | Das ........................ G06N 3/084 |
| | | 706/21 |

(Continued)

FOREIGN PATENT DOCUMENTS

| JP | 3-15768 A | 1/1991 |
| JP | 2000-210800 A | 8/2000 |

(Continued)

OTHER PUBLICATIONS

The Office Action for the corresponding Chinese application No. 201980075544.5, issued on Sep. 22, 2023.

(Continued)

*Primary Examiner* — Chun Cao
(74) *Attorney, Agent, or Firm* — Global IP Counselors, LLP

(57) ABSTRACT

A server displays information about a plurality of industrial machines on a display of a client computer. The server includes a storage device, a processor, and a communication device. The storage device stores state data indicative of states of a plurality of industrial machines. The processor determines remaining lives of the plurality of industrial machines from the state data. The processor generates data indicative of a machine list screen. The machine list screen includes identifiers of the plurality of industrial machines and the remaining lives. The communication device outputs the data indicative of the machine list screen to a client computer via a communication network.

13 Claims, 12 Drawing Sheets

(58) Field of Classification Search
USPC .......................................................... 700/111
See application file for complete search history.

(56) References Cited

U.S. PATENT DOCUMENTS

| | | | |
|---|---|---|---|
| 10,621,545 B2 | 4/2020 | Takigawa | |
| 2017/0039017 A1 | 2/2017 | Sakai et al. | |
| 2019/0258223 A1* | 8/2019 | Oota | B25J 9/1674 |
| 2022/0350325 A1* | 11/2022 | Cooper | B60C 11/243 |

FOREIGN PATENT DOCUMENTS

| | | |
|---|---|---|
| JP | 2002-358118 A | 12/2002 |
| JP | 2003-36320 A | 2/2003 |
| JP | 2003-67038 A | 3/2003 |
| JP | 2003-150237 A | 5/2003 |
| JP | 2010-139248 A | 6/2010 |
| JP | 2015-106194 A | 6/2015 |
| JP | 2015-190114 A | 11/2015 |
| JP | 2018-142256 A | 9/2018 |

OTHER PUBLICATIONS

The International Search Report for the corresponding international application No. PCT/JP2019/049434, issued on Jan. 28, 2020.

\* cited by examiner

| INSTALLATION LOCATION | MACHINE NAME | PREDICTIVE MAINTENANCE SLIDE DRIVE SYSTEM | | | | PREDICTIVE MAINTENANCE DIE CUSHION DRIVE SYSTEM | | | |
|---|---|---|---|---|---|---|---|---|---|
| | | RIGHT-FRONT | LEFT-FRONT | RIGHT-REAR | LEFT-REAR | RIGHT-FRONT | LEFT-FRONT | RIGHT-REAR | LEFT-REAR |
| AREA A | MACHINE A | 14 | 50 | 23 | 40 | 25 | 40 | 50 | 50 |
| AREA B | MACHINE B | 50 | 50 | 50 | 50 | 50 | 50 | 50 | 50 |
| AREA C | MACHINE C | 50 | 50 | 40 | 40 | | | | |
| ... | ... | ... | ... | ... | ... | ... | ... | ... | ... |

FIG. 12

SERVER, METHOD, AND SYSTEM FOR PROVIDING MAINTENANCE MANAGEMENT SERVICE FOR INDUSTRIAL MACHINE TO CLIENT COMPUTER

CROSS-REFERENCE TO RELATED APPLICATIONS

This application is a U.S. National stage application of International Application No. PCT/JP2019/049434, filed on Dec. 17, 2019. This U.S. National stage application claims priority under 35 U.S.C. § 119(a) to Japanese Patent Application No. 2019-035973, filed in Japan on Feb. 28, 2019, the entire contents of which are hereby incorporated herein by reference.

BACKGROUND

Field of the Invention

The present disclosure relates to a server, a method, and a system for providing a maintenance management service for an industrial machine to a client computer.

Background Information

Conventionally, a maintenance management service has been provided that detects an occurrence of an abnormality in an industrial machine and notifies the user of the occurrence of the abnormality. In the conventional technique, a user can grasp the state of the industrial machine by accessing the management server and acquiring the maintenance data (see, for example, Japanese Patent Laid-Open No. 2000-210800)

SUMMARY

The user may manage multiple industrial machines at the same time. In that case, the progress of deterioration differs for each of the plurality of industrial machines. Therefore, it is preferable that the user can easily grasp a priority of maintenance targets in the plurality of industrial machines.

An object of the present disclosure is to provide a maintenance management service that allows a user to easily grasp a priority of maintenance targets in a plurality of industrial machines.

Solution to Problems

A first aspect is a server for providing a maintenance management service for a plurality of industrial machines to a client computer. The server includes a storage device, a processor, and a communication device. The storage device stores state data indicating states of the plurality of industrial machines. The processor determines remaining lives of the plurality of industrial machines from the state data. The processor generates data indicating a machine list screen. The machine list screen includes identifiers of the plurality of industrial machines and the remaining lives. The communication device outputs data indicating the machine list screen to the client computer via a communication network.

A second aspect is a method performed by a processor for providing a maintenance management service for industrial machines to a client computer. The method includes the following processing. A first process is to acquire state data indicating states of a plurality of industrial machines. A second process is to determine remaining lives of the plurality of industrial machines from the state data. A third process is to generate data indicating a machine list screen. The machine list screen includes identifiers of the plurality of industrial machines and the remaining lives. A fourth process is to output data indicating the machine list screen to the client computer via a communication network.

A third aspect is a system for providing a maintenance management service for industrial machines to a client computer. The system includes a plurality of industrial machines, a plurality of local computers, and a server. The plurality of local computers are communicatively connected to each of the plurality of industrial machines. The server communicates with the plurality of local computers via a communication network. The server includes a storage device, a processor, and a communication device. The storage device stores state data received from the plurality of local computers. The state data shows states of the plurality of industrial machines. The processor determines remaining lives of the plurality of industrial machines from the state data. The processor generates data indicating a machine list screen. The machine list screen includes identifiers of the plurality of industrial machines and the remaining lives. The communication device outputs data indicating the machine list screen to the client computer via the communication network.

A fourth aspect is a system including a storage device, a processor, and a display. The storage device stores state data indicating states of a plurality of industrial machines. The processor determines remaining lives of the plurality of industrial machines from the state data. The processor generates data indicating a machine list screen. The machine list screen includes identifiers of the plurality of industrial machines and the remaining lives. The display displays the machine list screen.

Advantageous Effects of Invention

According to the present disclosure, it is possible to provide a maintenance management service that allows a user to easily grasp a priority of maintenance targets in a plurality of industrial machines.

BRIEF DESCRIPTION OF THE DRAWINGS

FIG. 12 is a diagram showing an example of a maintenance management screen.

DETAILED DESCRIPTION OF EMBODIMENT(S)

Figure 1:
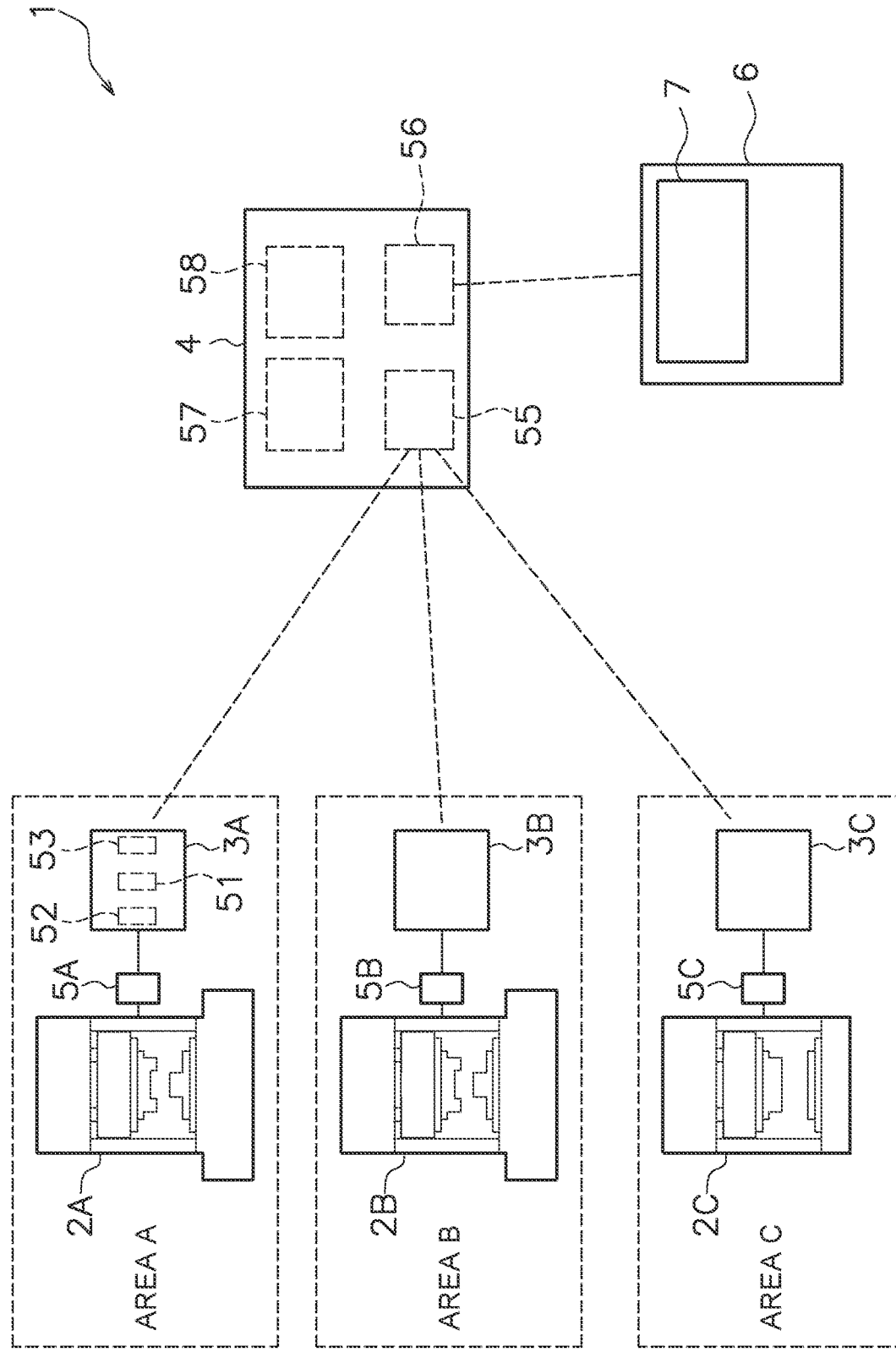
FIG. 1 is a schematic diagram showing a maintenance management system according to an embodiment.

Hereinafter, embodiments will be described with reference to the drawings. FIG. 1 is a schematic diagram showing a maintenance management system 1 according to an embodiment. The maintenance management system 1 is a system for determining a part to be maintained before a failure occurs in an industrial machine. The maintenance management system 1 includes industrial machines 2A to 2C, local computers 3A to 3C, and a server 4.

As illustrated in FIG. 1, the industrial machines 2A to 2C may be arranged in different areas. Alternatively, the industrial machines 2A to 2C may be arranged in the same area. For example, the industrial machines 2A to 2C may be arranged in different factories. Alternatively, the industrial machines 2A to 2C may be arranged in the same factory. In the present embodiment, the industrial machine 2A to 2C is a press machine. In addition, in FIG. 1, three industrial machines are illustrated. However, the number of industrial machines may be less than three or more than three.

Figure 2:
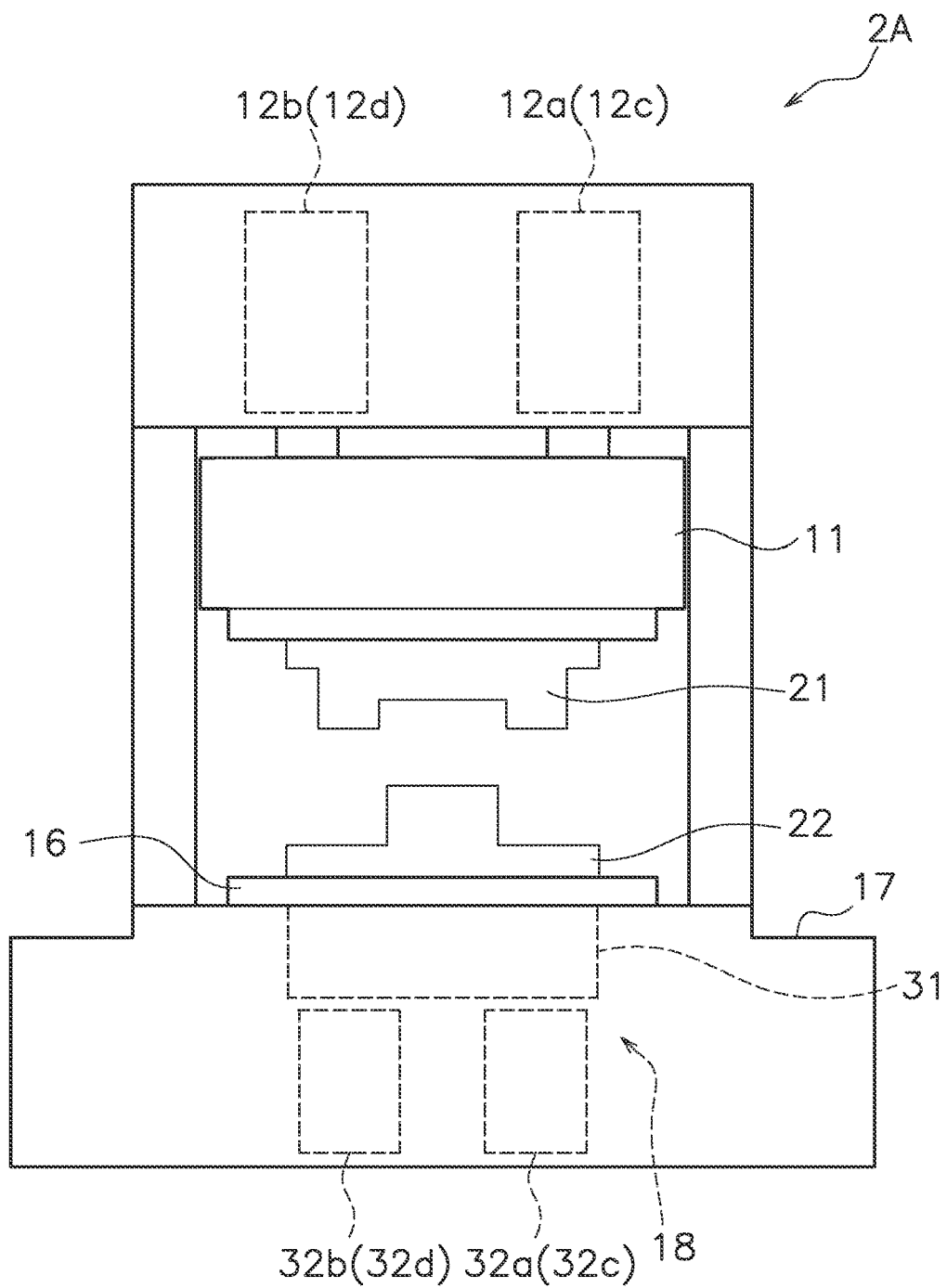
FIG. 2 is a front view of an industrial machine.

FIG. 2 is a front view of the industrial machine 2A. The industrial machine 2A includes a slider 11, a plurality of slide drive systems 12a to 12d, a bolster 16, a bed 17, a die cushion device 18, and a controller 5A (see FIG. 1). The slider 11 is configured to move up and down. An upper mold 21 is attached to the slider 11. The plurality of slide drive systems 12a to 12d operate the slider 11. The industrial machine 2A includes, for example, four slide drive systems 12a to 12d. In FIG. 2, two slide drive systems 12a and 12b are illustrated. The other slide drive systems 12c and 12d are arranged behind the slide drive systems 12a and 12b. However, the number of slide drive systems is not limited to four, and may be less than four or more than four.

The bolster 16 is arranged below the slider 11. A lower mold 22 is attached to the bolster 16. The bed 17 is arranged below the bolster 16. The die cushion device 18 applies an upward load to the lower mold 22 at the time of pressing. Specifically, the die cushion device 18 applies an upward load to the blank holder portion of the lower mold 22 during pressing. The controller 5A controls the operation of the slider 11 and the die cushion device 18.

Figure 3:
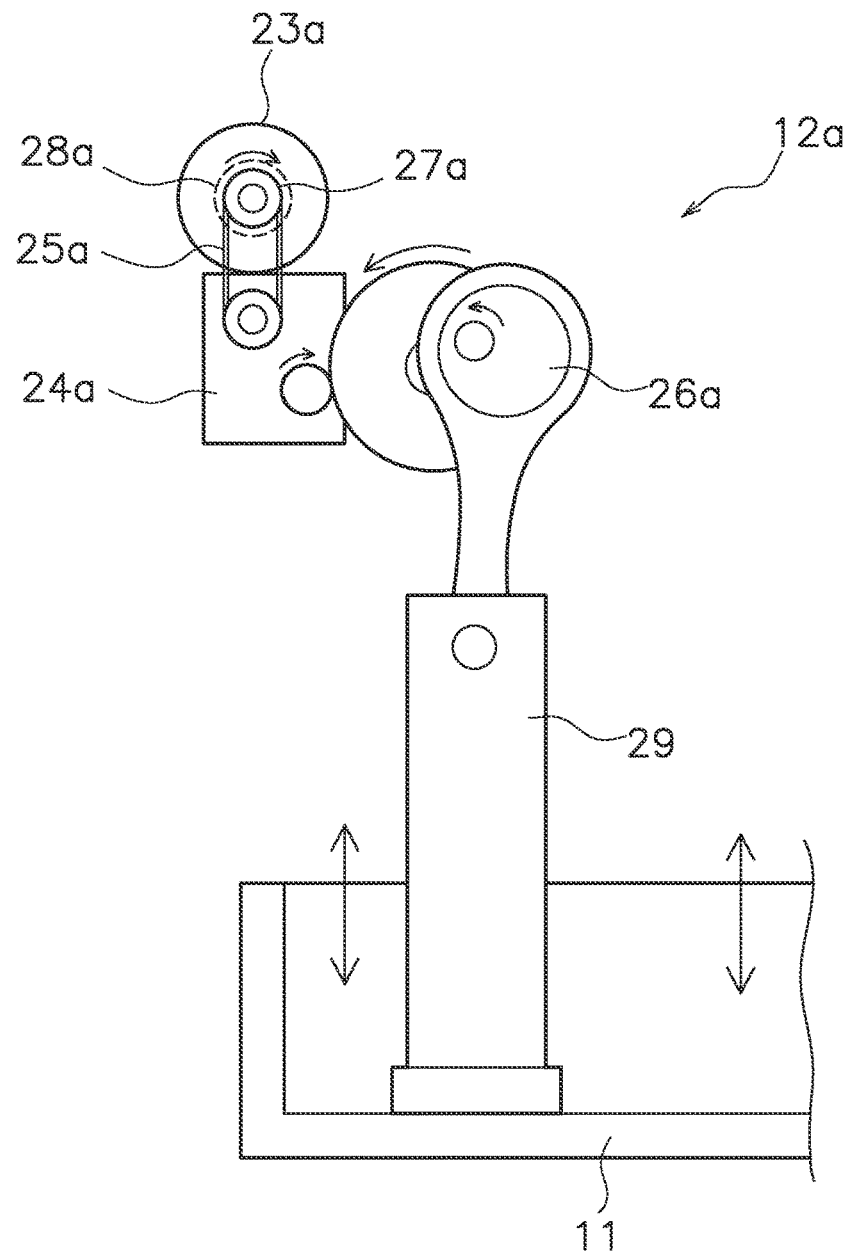
FIG. 3 is a diagram showing a slide drive system.

FIG. 3 is a diagram showing a slide drive system 12a. As illustrated in FIG. 3, the slide drive system 12a includes a plurality of movable parts such as a servomotor 23a, a speed reducer 24a, a timing belt 25a, and a connecting rod 26a. The servomotor 23a, the speed reducer 24a, the timing belt 25a, and the connecting rod 26a are connected to each other so as to operate in conjunction with each other.

The servomotor 23a is controlled by the controller 5A. The servomotor 23a includes an output shaft 27a and a motor bearing 28a. The motor bearing 28a supports the output shaft 27a. The speed reducer 24a includes a plurality of gears. The speed reducer 24a is connected to the output shaft 27a of the servomotor 23a via a timing belt 25a. The speed reducer 24a is connected to the connecting rod 26a. The connecting rod 26a is connected to a support shaft 29 of the slider 11. The support shaft 29 is slidable in the vertical direction with respect to the support shaft holder (not illustrated). The driving force of the servomotor 23a is transmitted to the slider 11 via the timing belt 25a, the speed reducer 24a, and the connecting rod 26a. As a result, the slider 11 moves up and down.

The other slide drive systems 12b to 12d also have the same configuration as the slide drive system 12a described above. In the following description, among the configurations of the other slide drive system 12b to 12d, those corresponding to the configurations of the slide drive system 12a have the same numbers as the configurations of the slide drive system 12a and the alphabets of the configurations of the slide drive systems 12b to 12d. For example, the slide drive system 12b includes a servomotor 23b. The slide drive system 12c includes a servomotor 23c.

As illustrated in FIG. 2, the die cushion device 18 includes a cushion pad 31 and a plurality of die cushion drive systems 32a to 32d. The cushion pad 31 is arranged below the bolster 16. The cushion pad 31 is configured to move up and down. The plurality of die cushion drive systems 32a to 32d operate the cushion pad 31 up and down. The industrial machine 2A includes, for example, four die cushion drive systems 32a to 32d. However, the number of die cushion drive systems is not limited to four, and may be less than four or more than four. In FIG. 2, two die cushion drive systems 32a and 32b are illustrated. The other die cushion drive systems 32c and 32d are arranged behind the die cushion drive systems 32a and 32b.

Figure 4:
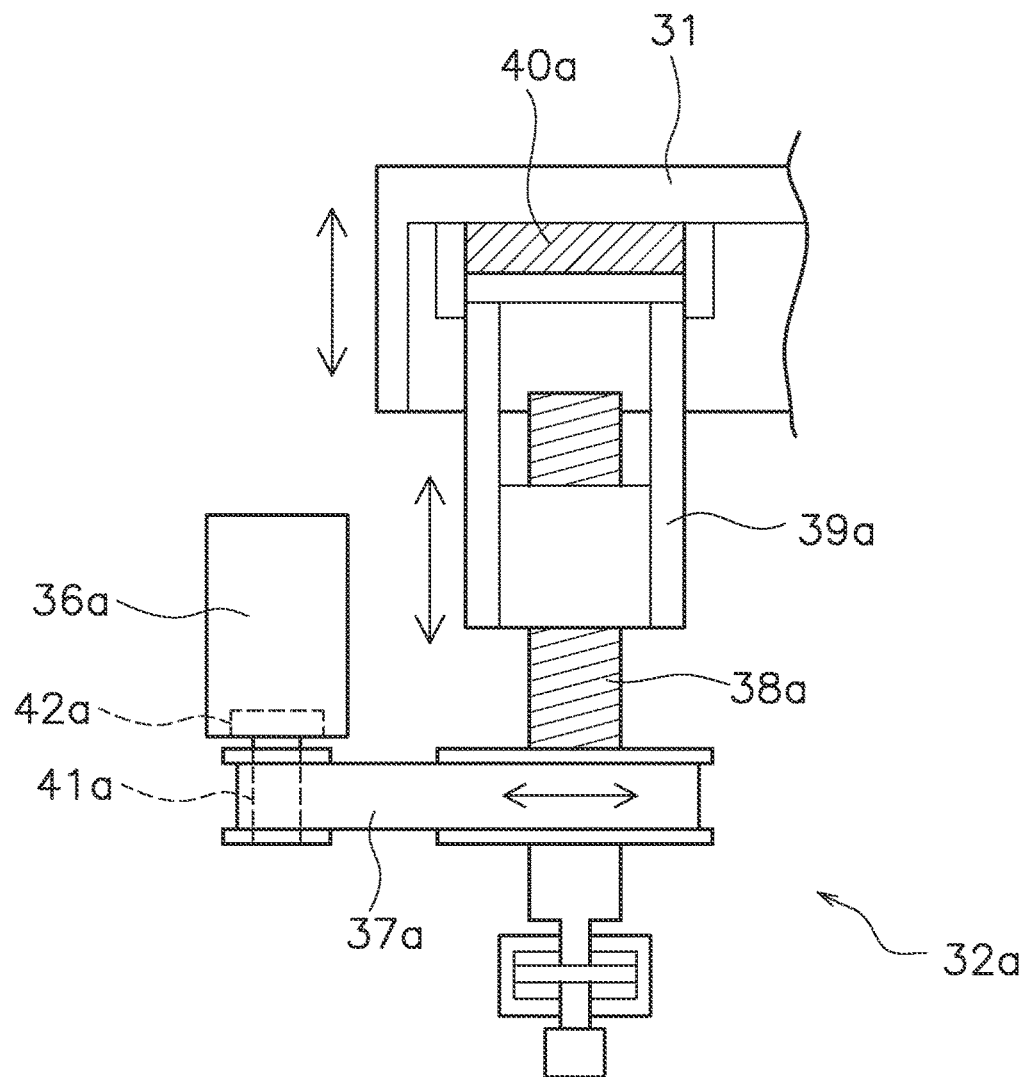
FIG. 4 is a diagram showing a die cushion drive system.

FIG. 4 is a diagram showing a die cushion drive system 32a. As illustrated in FIG. 4, the die cushion drive system 32a includes a plurality of movable parts such as a servomotor 36a, a timing belt 37a, a ball screw 38a, and a drive device 39a. The servomotor 36a, the timing belt 37a, and the ball screw 38a are connected to each other so as to operate in conjunction with each other. The servomotor 36a is controlled by the controller 5A. The servomotor 36a includes an output shaft 41a and a motor bearing 42a. The motor bearing 42a supports the output shaft 41a.

The output shaft 41a of the servomotor 36a is connected to the ball screw 38a via the timing belt 37a. The ball screw 38a moves up and down by rotating. The drive device 39a includes a nut portion that is screwed with the ball screw 38a. The drive device 39a moves upward by being pressed by the ball screw 38a. The drive device 39a includes a piston arranged in the oil chamber 40a. The drive device 39a supports the cushion pad 31 via the oil chamber 40a.

The other die cushion drive systems 32b to 32d also have the same configuration as the die cushion drive system 32a described above. In the following description, among the configurations of the other die cushion drive systems 32b to 32d, those corresponding to the configurations of the die cushion drive system 32a have the same numbers as the configurations of the die cushion drive system 32a and the alphabets of the configurations of the die cushion drive systems 32b to 32d. For example, the die cushion drive system 32b includes a servomotor 36b. The die cushion drive system 32c includes a servomotor 36c.

The configurations of the other industrial machines 2B and 2C are the same as those of the above-mentioned industrial machine 2A. As illustrated in FIG. 1, the industrial machines 2B and 2C are controlled by the controllers 5B and 5C, respectively. The industrial machines 2A to 2C may not be provided with a die cushion device. For example, the industrial machine 2C is a press machine without a die cushion device.

The local computers 3A to 3C communicate with the controllers 5A to 5C of the industrial machines 2A to 2C, respectively. As illustrated in FIG. 1, the local computer 3A includes a processor 51, a storage device 52, and a communication device 53. The processor 51 is, for example, a CPU (central processing unit). Alternatively, the processor 51 may be a processor different from the CPU. The processor 51 executes the process for predictive maintenance of the industrial machine 2A according to the program.

The storage device 52 includes a non-volatile memory such as ROM and a volatile memory such as RAM. The storage device 52 may include an auxiliary storage device such as a hard disk or an SSD (Solid State Drive). The storage device 52 is an example of a non-transitory recording medium that can be read by a computer. The storage device 52 stores computer commands and data for controlling the local computer 3A. The communication device 53 communicates with the server 4. The configurations of the other local computers 3B and 3C are the same as those of the local computer 3A.

The server 4 collects data for predictive maintenance from the industrial machines 2A to 2C via the local computers 3A to 3C. The server 4 executes the maintenance management service based on the collected data. In the maintenance management service, the parts to be maintained are specified. The server 4 communicates with the client computer 6. The server 4 provides a maintenance management service to the client computer 6.

The server 4 includes a first communication device 55, a second communication device 56, a processor 57, and a storage device 58. The first communication device 55 communicates with the local computers 3A to 3C. The second communication device 56 communicates with the client computer 6. The processor 57 is, for example, a CPU (central processing unit). Alternatively, the processor 57 may be a processor different from the CPU. The processor 57 executes the process for the maintenance management service according to the program.

The storage device 58 includes a non-volatile memory such as ROM and a volatile memory such as RAM. The storage device 58 may include an auxiliary storage device such as a hard disk or an SSD (Solid State Drive). The storage device 58 is an example of a non-transitory recording medium that can be read by a computer. The storage device 58 stores computer commands and data for controlling the server 4.

The above-mentioned communication may be performed via a mobile communication network such as 3G, 4G, or 5G. Alternatively, the communication may be performed via another wireless communication network such as satellite communication. Alternatively, the communication may be performed via a computer communication network such as LAN, VPN, or the Internet. Alternatively, communication may be performed via a combination of these communication networks.

Figure 5:
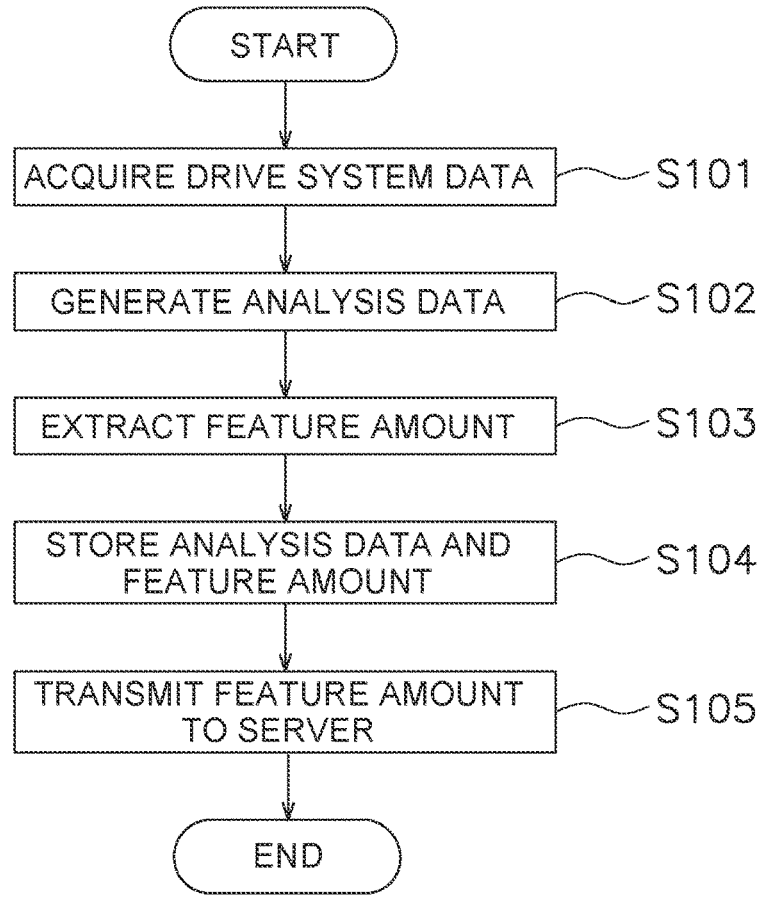
FIG. 5 is a flowchart showing a process executed by a local computer.

Next, the processing for the maintenance management service will be described. FIG. 5 is a flowchart showing the processing executed by the local computers 3A to 3C. Hereinafter, the case where the local computer 3A executes the process illustrated in FIG. 5 will be described, but the other local computers 3B and 3C also execute the same process as the local computer 3A.

As illustrated in FIG. 5, in step S101, the local computer 3A acquires the drive system data from the controller 5A of the industrial machine 2A. The drive system data includes acceleration of a part included in the drive systems 12a to 12d and 32a to 32d. For example, the drive system data includes the angular acceleration of the servomotors 23a to 23d and 36a to 36d. The angular acceleration may be calculated from the rotational speeds of the servomotors 23a to 23d and 36a to 36d. Alternatively, the angular acceleration may be detected by a sensor such as a vibration sensor. Hereinafter, a case where the local computer 3A acquires the drive system data of the drive system 12a will be described.

The local computer 3A acquires the drive system data of the drive system 12a when a predetermined start condition is satisfied. The predetermined start condition includes that a predetermined time has passed since the previous acquisition. The predetermined time is, for example, several hours, but is not limited to this. The predetermined start condition is that the rotation speed of the servomotor 23a exceeds a predetermined threshold value. The predetermined threshold value is preferably a value indicating that, for example, the industrial machine 2A is in operation and not in press working.

The local computer 3A acquires a plurality of values of the angular acceleration of the servomotor 23a at a predetermined sampling cycle. The number of samples is, for example, several hundred to several thousand, but is not limited to this. One unit of drive system data includes a plurality of angular acceleration values sampled within a predetermined time. The predetermined time may be, for example, a time corresponding to several rotations of the servomotor 23a.

In step S102, the local computer 3A generates analysis data. The local computer 3A generates analysis data from the drive system data by, for example, a fast Fourier transform. However, the local computer 3A may use a frequency analysis algorithm different from the fast Fourier transform. The drive system data and the analysis data are examples of state data indicating the state of the drive system of the industrial machine 2A.

Figure 6:
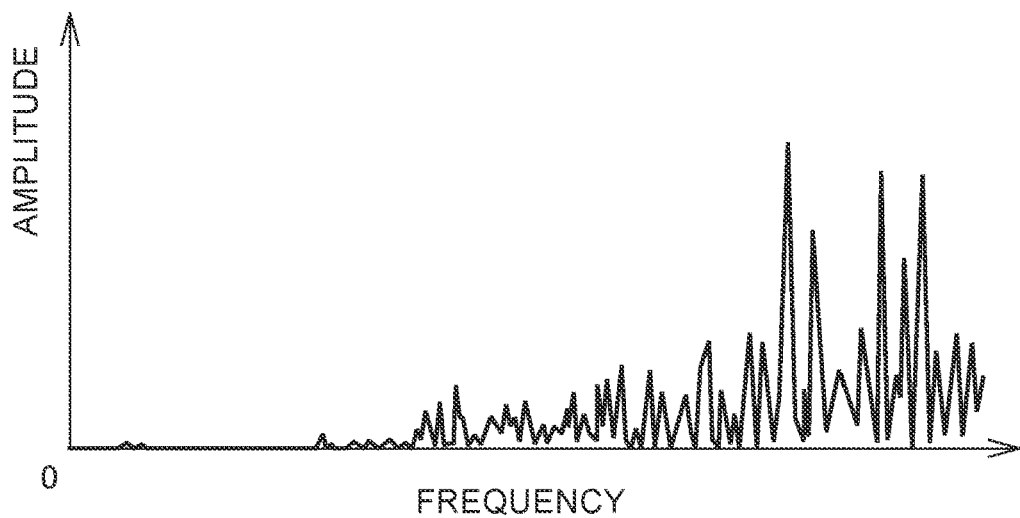
FIG. 6 is a diagram showing an example of analysis data.

In step S103, the local computer 3A extracts the feature amount from the analysis data. FIG. 6 is a diagram showing an example of analysis data. In FIG. 6, the horizontal axis is frequency and the vertical axis is amplitude. The feature amount is, for example, the value of the peak having an amplitude equal to or higher than the threshold value and the frequency thereof.

In step S104, the local computer 3A stores the analysis data and the feature amount in the storage device 52. The local computer 3A stores the analysis data and the feature amount together with the data indicating the acquisition time of the drive system data corresponding to them. In step S105, the local computer 3A transmits the feature amount to the server 4. Here, the local computer 3A transmits the feature amount to the server 4 instead of the analysis data.

The local computer 3A generates one unit of the state data file for the drive system 12a, and stores the state data file in the storage device 52. One unit of the state data file includes one unit of drive system data, analysis data converted from the drive system data, and a feature amount.

Further, the state data file includes data indicating the time when the state data was acquired. The state data file includes data indicating an identifier of the state data file. The state data file includes data indicating the corresponding drive system identifier. The identifier may be a name or a code. The local computer 3A transmits both the feature amount and the identifier of the state data file corresponding to the feature amount to the server 4.

The local computer 3A executes the same processing as the above processing for the other drive systems 12b to 12d and 32a to 32d. The local computer 3A generates the state data file for each of the other drive systems 12b to 12d and 32a to 32d. The local computer 3A transmits the feature amount and the identifier of the state data file corresponding to the feature amount to the server 4 for each of the other drive systems 12b to 12d and 32a to 32d. Further, the local computer 3A repeats the above-described processing at predetermined time intervals. As a result, a plurality of state data files at predetermined time intervals are stored and accumulated in the storage device 52.

The local computer 3B executes the same processing as the local computer 3A on the industrial machine 2B. Further, the local computer 3C executes the same processing as the local computer 3A on the industrial machine 2C.

Figure 7:
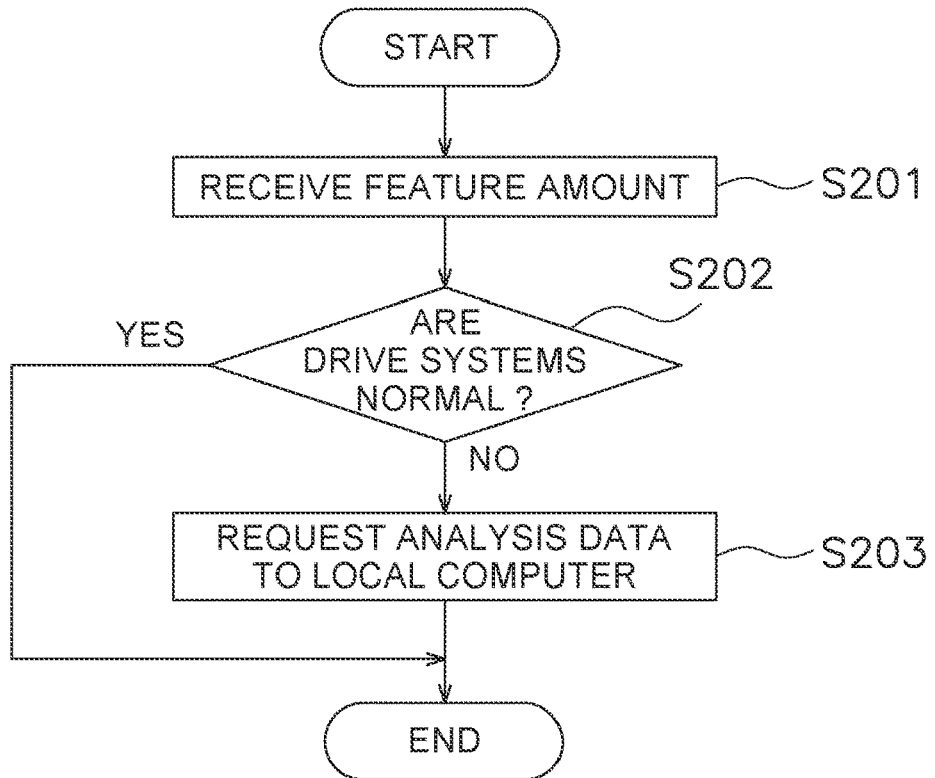
FIG. 7 is a flowchart showing a process executed by a server.

FIG. 7 is a flowchart showing the processing executed by the server 4. In the following description, processing when the server 4 receives the feature amount from the local computer 3A will be described. As illustrated in FIG. 7, in step S201, the server 4 receives the feature amount. The server 4 receives the feature amount from the local computer 3A.

In step S202, the server 4 determines whether the drive systems 12a to 12d and 32a to 32d are normal. The server 4 determines whether each of the drive systems 12a to 12d and 32a to 32d is normal from the feature amount corresponding to the drive systems 12a to 12d and 32a to 32d. The determination as to whether the drive systems 12a to 12d and 32a to 32d are normal may be performed by a known determination method in quality engineering. For example, the server 4 uses the MT method (Mahalanobis Taguchi method) to determine whether the drive systems 12a to 12d and 32a to 32d are normal. However, the server 4 may use another method to determine whether the drive systems 12a to 12d and 32a to 32d are normal.

When the server 4 determines in step S202 that at least one of the drive systems 12a to 12d and 32a to 32d is not normal, the process proceeds to step S203. The fact that the drive systems 12a to 12d and 32a to 32d are not normal means that the drive systems 12a to 12d and 32a to 32d have not yet failed, but have deteriorated to some extent.

In step S203, the server 4 requests the analysis data from the local computer 3A. The server 4 transmits the transmission request signal of the analysis data to the local computer 3A. The request signal includes the identifier of the state data file corresponding to the drive system determined to be abnormal. The server 4 transmits the request signal to the local computer 3A and requests the analysis data of the state data file.

Figure 8:
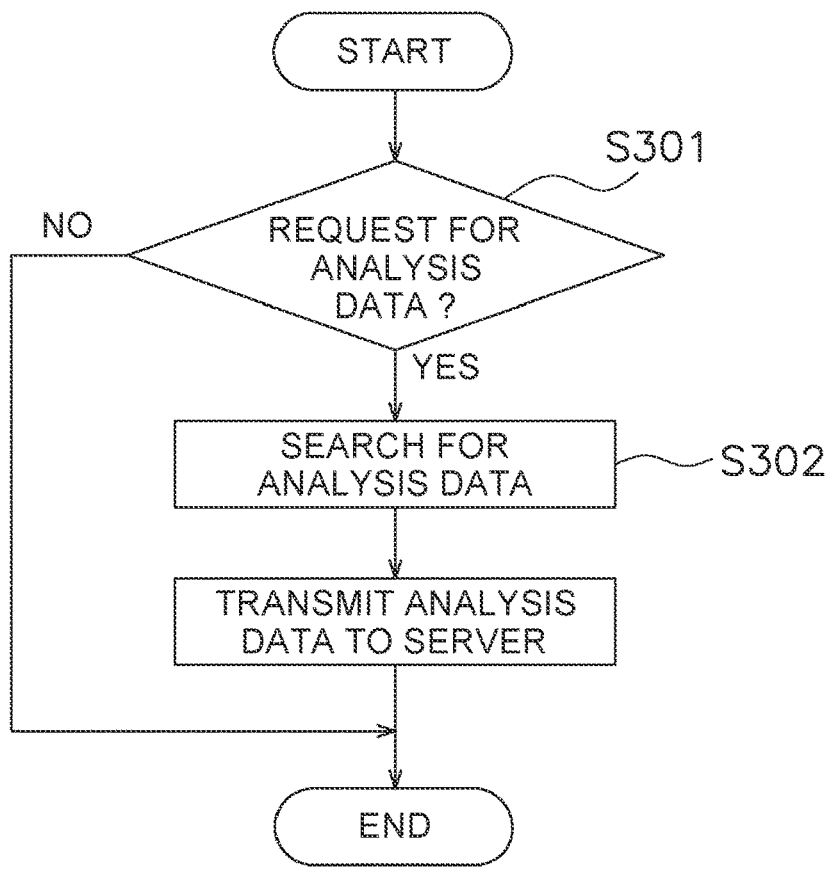
FIG. 8 is a flowchart showing a process executed by the local computer.

FIG. 8 is a flowchart showing a process executed by the local computer 3A. As illustrated in FIG. 8, in step S301, the local computer 3A determines whether there is a request for analysis data from the server 4. When the local computer 3A receives the above-mentioned request signal from the server 4, it determines that there is a request for analysis data.

In step S302, the local computer 3A searches for analysis data. The local computer 3A searches the analysis data in the requested state data file from the plurality of state data files stored in the storage device 52. In step S303, the local computer 3A transmits the requested analysis data to the server 4.

Figure 9:
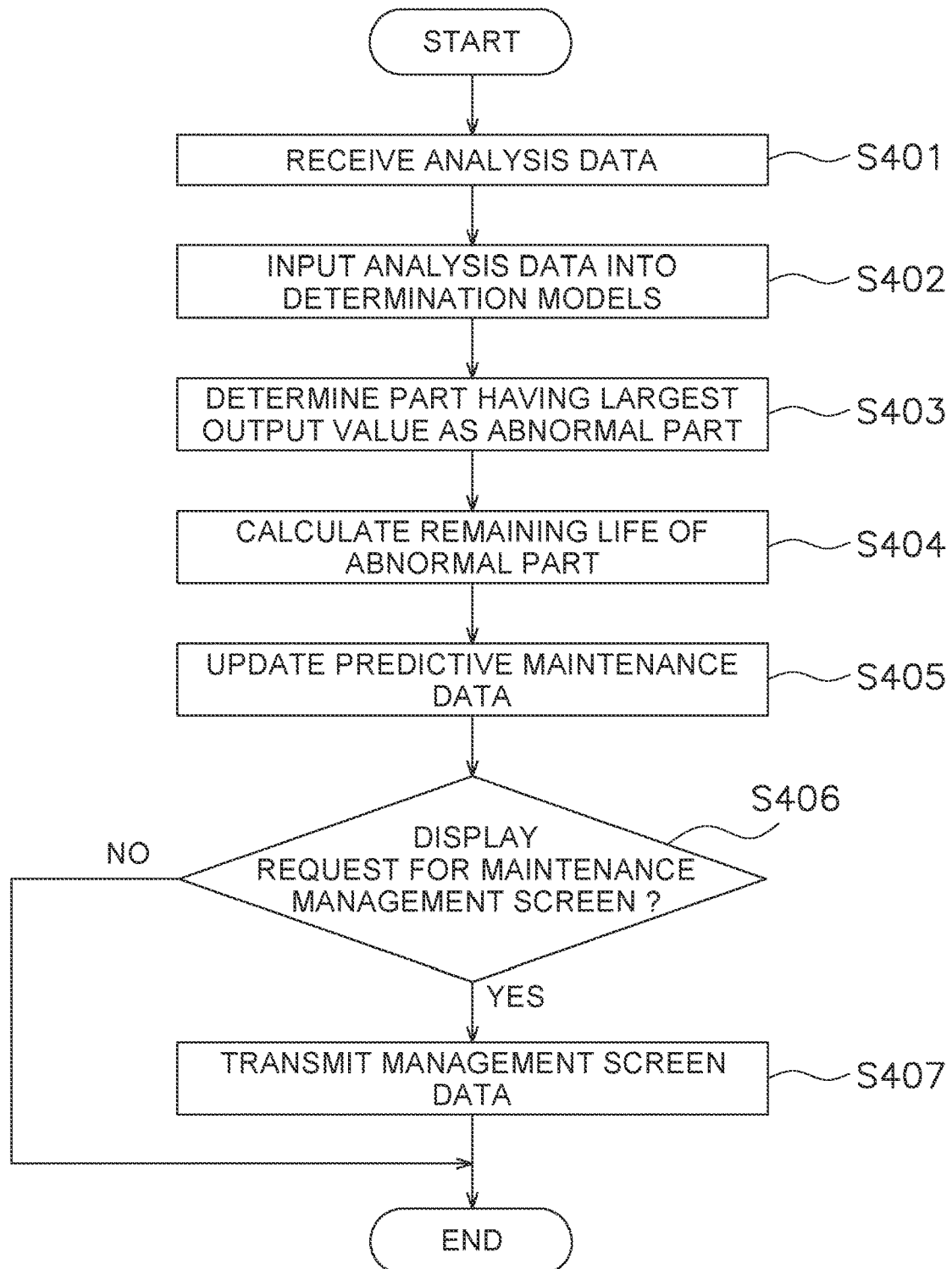
FIG. 9 is a flowchart showing a process executed by the server.

FIG. 9 is a flowchart showing the processing executed by the server 4. As illustrated in FIG. 9, in step S401, the server 4 receives the analysis data from the local computer 3A. The server 4 stores the analysis data in the storage device 58. In step S402, the server 4 inputs the analysis data into the determination models 60 and 70.

Figure 10A:
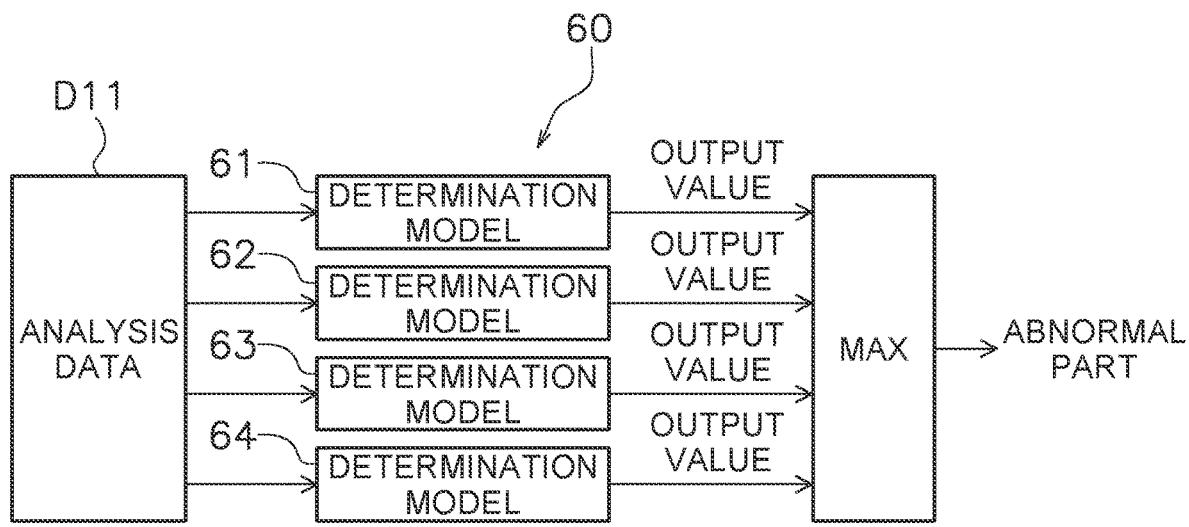
FIG. 10A and FIG. 10B are diagrams showing a determination model.
Figure 10B:
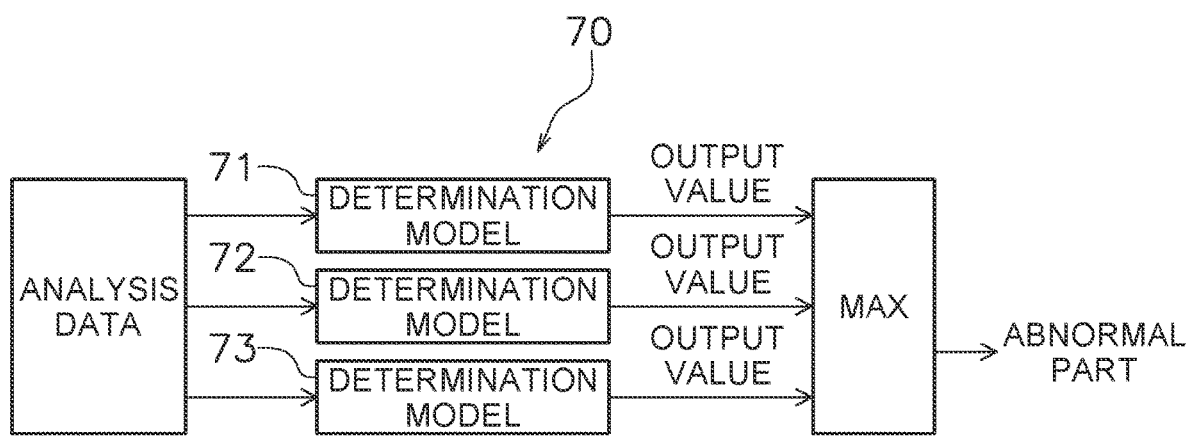

As illustrated in FIGS. 10A and 10B, the server 4 has determination models 60 and 70. The determination models 60 and 70 are models that have been trained by machine learning so as to output the possibility of abnormality of a part included in the drive system by inputting the analysis data. The determination models 60 and 70 include an artificial intelligence algorithm and learning-tuned parameters. The determination models 60 and 70 are stored in the storage device 58 as data. The determination models 60 and 70 include, for example, a neural network. The determination models 60 and 70 include a deep neural network such as a convolutional neural network (CNN).

The server 4 has a determination model 60 for the slide drive systems 12a to 12d and a determination model 70 for the die cushion drive systems 32a to 32d. The determination model 60 includes a plurality of determination models 61 to 64. Each of the plurality of determination models 61 to 64 corresponds to a plurality of parts included in the slide drive systems 12a to 12d. The determination model 60 outputs a value indicating the possibility of abnormality of the corresponding part from the input waveform of the analysis data. The determination models 61 to 64 have been trained by the training data.

Figure 11A:
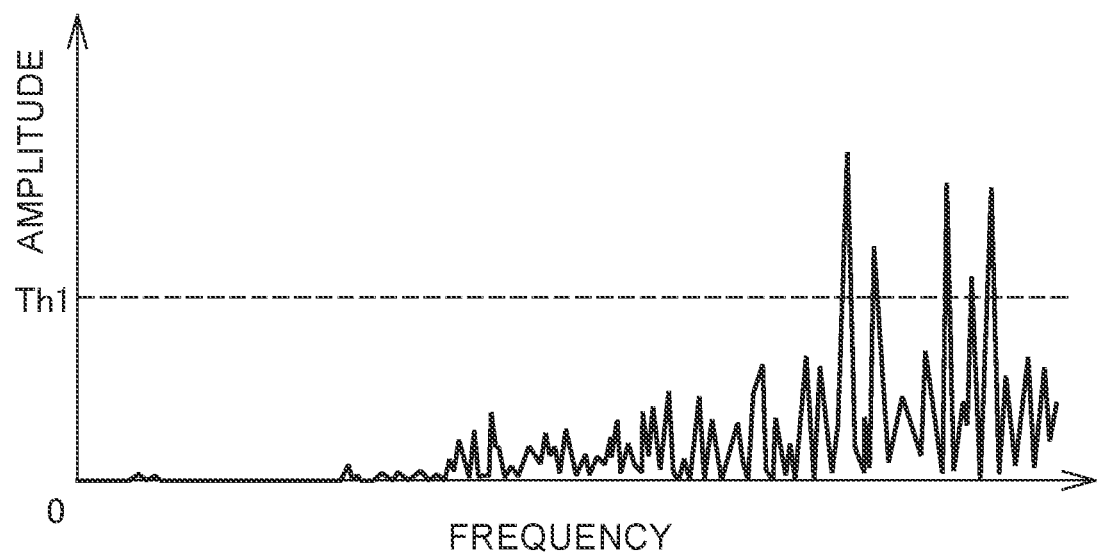
FIG. 11A and FIG. 11B are diagrams showing an example of training data.
Figure 11B:
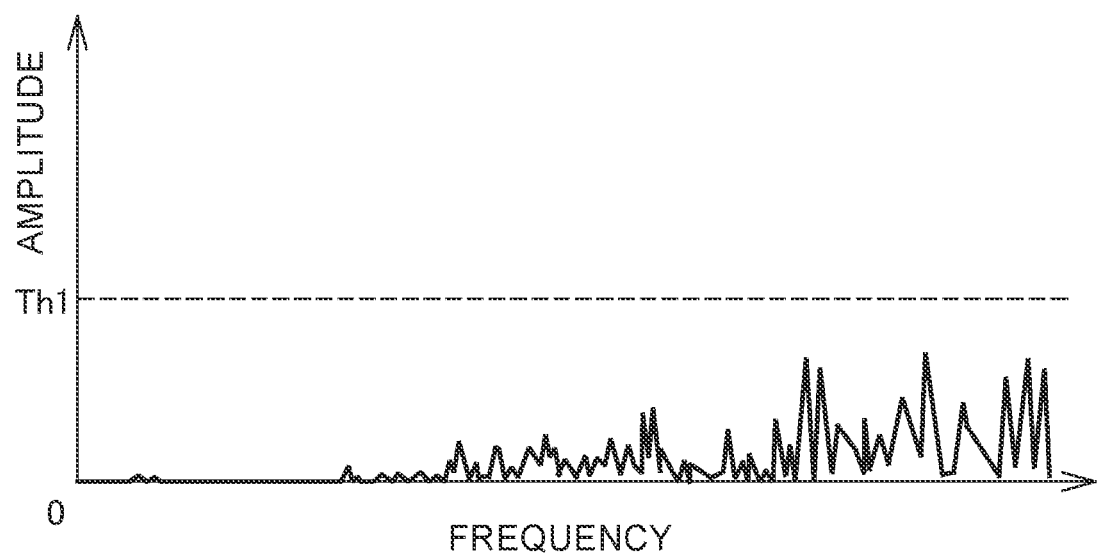

The training data includes analysis data at the time of abnormality and analysis data at the time of normal. FIG. 11A is an example of analysis data at the time of abnormality. FIG. 11B is an example of the analysis data at the time of normal. The analysis data at the time of abnormality is the analysis data from immediately before the occurrence of the abnormality at the corresponding part to a time prior to the occurrence of the abnormality by a predetermined period. As illustrated in FIG. 11A, in the analysis data at the time of abnormality, a plurality of peaks of the waveform exceed a predetermined threshold Th1. The analysis data in the normal state is the analysis data when the usage time of the part is short and no abnormality has occurred. In the normal analysis data, all the peaks of the waveform are lower than the predetermined threshold Th1.

As illustrated in FIG. 10A, in the present embodiment, the server 4 has a determination model 61 for the motor bearing, a determination model 62 for the timing belt, and a determination model 63 for the connecting rod, and a determination model 64 for the speed reducer with respect to the slide drive systems 12a to 12d. The determination model 61 for the motor bearing outputs a value indicating the possibility of abnormality of the motor bearings 28a to 28d from the analysis data. The determination model 62 for the timing belt outputs a value indicating the possibility of abnormality of the timing belts 25a to 25d from the analysis data. The determination model 63 for the connecting rod outputs a value indicating the possibility of abnormality of the connecting rods 26a to 26d from the analysis data. The determination model 64 for the speed reducer outputs a value indicating the possibility of an abnormality in the bearings of the speed reducers 24a to 24d from the analysis data.

As illustrated in FIG. 10B, the server 4 has a determination model 71 for the motor bearing, a determination model 72 for the timing belt, and a determination model 73 for the ball screw with respect to the die cushion drive system 32a to 32d. The determination model 71 for the motor bearing outputs a value indicating the possibility of abnormality of the motor bearings 42a to 42d from the analysis data. The determination model 72 for the timing belt outputs a value indicating the possibility of abnormality of the timing belts 37a to 37d from the analysis data. The determination model 73 for the ball screw outputs a value indicating the possibility of abnormality of the ball screw 38a to 38d from the analysis data.

The server 4 inputs the analysis data acquired in step S401 into each of the above-mentioned determination models 61 to 64 or each of the determination models 71 to 73. For example, when it is determined that the slide drive system 12a is not normal, the server 4 inputs the analysis data of the slide drive system 12a into the determination models 61 to 64. As a result, the server 4 acquires a value indicating the possibility of abnormality in each part of the slide drive system 12a as an output value.

Alternatively, when it is determined that the die cushion drive system 32a is not normal, the server 4 inputs the analysis data of the die cushion drive system 32a into the determination models 71 to 73. As a result, the server 4 acquires a value indicating the possibility of abnormality in each part of the die cushion drive system 32a as an output value.

In step S403, the server 4 determines that the part having the largest output value is the abnormal part. For example, the server 4 determines, as the abnormal part, a part corresponding to the largest output value among the output values from the determination model 61 for the motor bearing, the determination model 62 for the timing belt, the determination model 63 for the connecting rod, and the determination model 64 for the speed reducer with respect to the slide drive system 12a. Alternatively, the server 4 determines, as the abnormal part, a part corresponding to the largest output value among the output values from the determination model 71 for the motor bearing, the determination model 72 for the timing belt, and the determination model 73 for the ball screw with respect to the die cushion drive system 32a.

In step S404, the server 4 calculates the remaining life of the abnormal part. For example, the server 4 may calculate the remaining life of the abnormal part by using a known method of quality engineering such as the MT method (Mahalanobis Taguchi method). However, the server 4 may calculate the remaining life by using another method.

In step S405, the server 4 updates the predictive maintenance data. The predictive maintenance data is stored in the storage device 58. The predictive maintenance data includes data indicating the remaining life of the drive system of the industrial machines 2A to 2C registered in the server 4. The predictive maintenance data includes data indicating the remaining life of the part determined to be the abnormal part among the plurality of parts of the drive system.

In step S406, the server 4 determines whether there is a display request for the maintenance management screen. When the server 4 receives the request signal of the maintenance management screen from the client computer 6, it determines that there is the display request of the maintenance management screen. When there is the display request for the maintenance management screen, the server 4 transmits the management screen data. The management screen data is data for displaying the maintenance management screen on the display 7 of the client computer 6.

Figure 13:
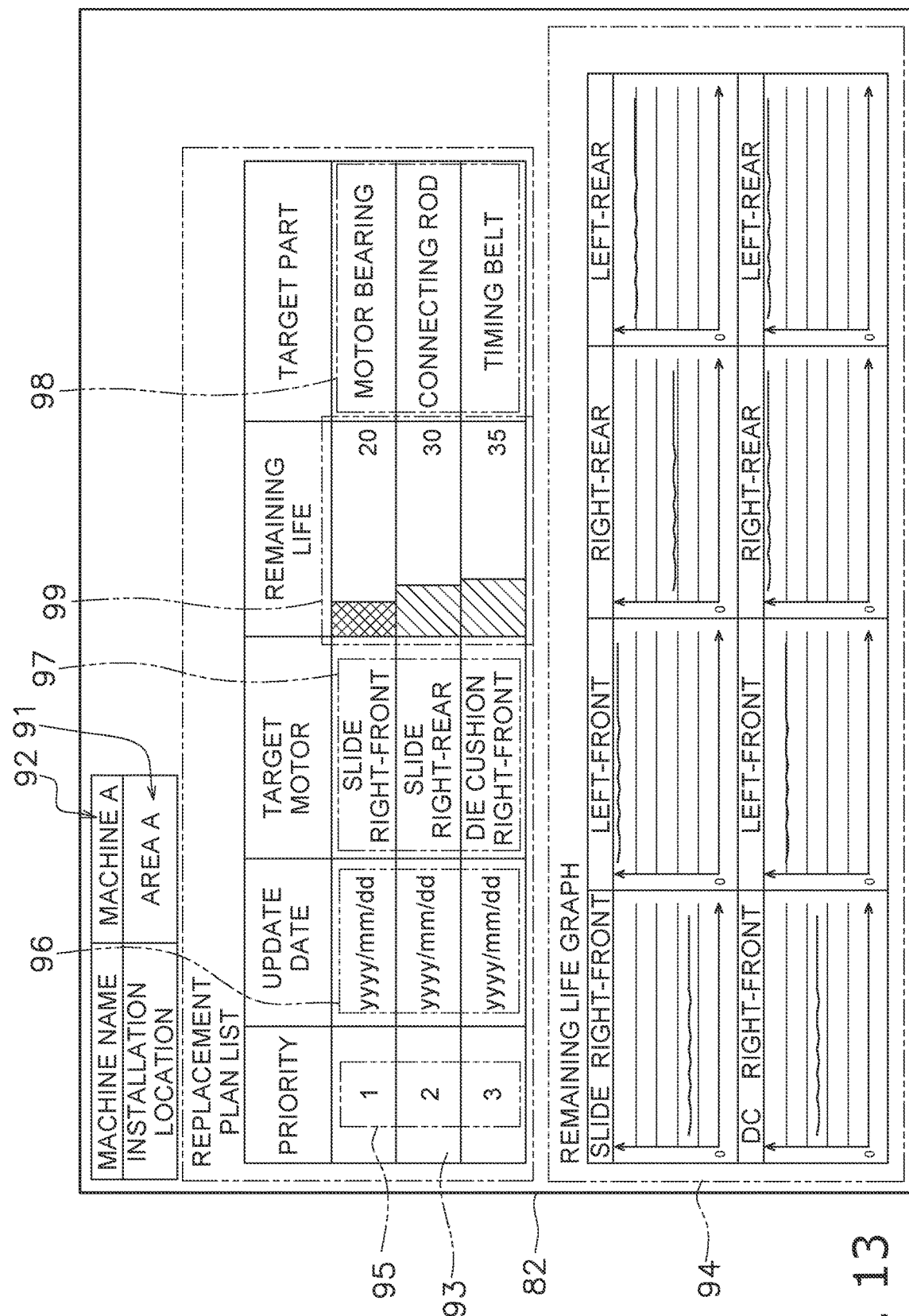
FIG. 13 is a diagram showing an example of the maintenance management screen.

FIGS. 12 and 13 are views showing an example of the maintenance management screen. The maintenance management screen includes a machine list screen 81 illustrated in FIG. 12, and a machine individual screen 82 illustrated in FIG. 13. The user of the client computer 6 can selectively display the machine list screen 81 and the machine individual screen 82 on the display 7. When the machine list screen 81 is selected, the server 4 generates data indicating the machine list screen 81 based on the predictive maintenance data, and transmits the data indicating the machine list screen 81 to the client computer 6. When the machine individual screen 82 is selected, the server 4 generates data indicating the machine screen based on the predictive maintenance data, and transmits the data indicating the machine individual screen 82 to the client computer 6.

FIG. 12 is a diagram showing an example of the machine list screen 81. The machine list screen 81 displays predictive maintenance data related to a plurality of industrial machines 2A to 2C registered in the server 4. As illustrated in FIG. 12, the machine list screen 81 includes an area identifier 83, a machine identifier 84, a drive system identifier 85, and a life indicator 86. On the machine list screen 81, the area identifier 83, the machine identifier 84, the drive system identifier 85, and the life indicator 86 are displayed in a list.

The area identifier 83 is an identifier of the area where the industrial machines 2A to 2C are arranged. The machine identifier 84 is an identifier for each of the industrial machines 2A to 2C. The drive system identifier 85 is an identifier of the slide drive systems 12a to 12d or the die cushion drive systems 32a to 32d. These identifiers may be names or codes.

The life indicator 86 indicates the remaining life of the slide drive systems 12a to 12d or the die cushion drive systems 32a to 32d for each of the industrial machines 2A to 2C. The life indicator 86 includes a numerical value indicating the remaining life. The remaining life is indicated by, for example, the number of days. However, the remaining life may be expressed in other units such as hours.

The life indicator 86 also includes a graphic display indicating the remaining life. In the present embodiment, the graphic display is a bar display. The server 4 changes the length of the bar of the life indicator 86 according to the remaining life. However, the remaining life may be displayed by another display mode.

Similar to step S404, the server 4 may determine the remaining life from the feature amount of the drive system determined to be normal, and display the remaining life with the life indicator 86. The server 4 may display the remaining life of the abnormal part determined in step S404 described above with the life indicator 86 for the drive system including the abnormal part.

On the machine list screen 81, the server 4 displays a plurality of drive system life indicators 86 in different colors according to the remaining life. For example, when the remaining life is equal to or greater than the first threshold value, the server 4 displays the life indicator 86 in a normal color. When the remaining life is smaller than the first threshold value and equal to or larger than the second threshold value, the server 4 displays the life indicator 86 in the first warning color. When the remaining life is smaller than the second threshold value, the server 4 displays the life indicator 86 in the second warning color. The second threshold value is smaller than the first threshold value. The normal color, the first warning color, and the second warning color are different colors from each other. Therefore, the life indicator 86 of the part having a short remaining life is displayed in a different color from the life indicator 86 of the normal part.

FIG. 13 is a diagram showing an example of the machine individual screen 82. When the server 4 receives the request signal of the machine individual screen 82 from the client computer 6, the server 4 transmits data for displaying the machine individual screen 82 on the display 7 to the client computer 6. The machine individual screen 82 displays predictive maintenance data for one industrial machine selected from the plurality of industrial machines 2A to 2C registered in the server 4. However, the machine individual screen 82 may display predictive maintenance data for a plurality of selected industrial machines.

Hereinafter, the machine individual screen 82 when the industrial machine 2A is selected will be described. The machine individual screen 82 includes an area identifier 91, an industrial machine identifier 92, a replacement plan list 93, and a remaining life graph 94. The area identifier 91 is an identifier of the area in which the industrial machine 2A is arranged. The machine identifier 92 is an identifier of the industrial machine 2A.

The replacement plan list 93 displays predictive maintenance data for a part to be maintained among a plurality of parts. The part determined to be the abnormal part by the above-mentioned determination models 60 and 70 is displayed in the replacement plan list 93. Therefore, when the server 4 determines that there is an abnormality in at least one of the plurality of parts, the server 4 can notify the user of the abnormality by displaying the part in the replacement plan list 93.

In the replacement plan list 93, at least a part of a plurality of parts included in each drive system of the industrial machine 2A is displayed in order from the one having the shortest remaining life. The replacement plan list 93 includes a priority 95, an update date 96, a drive system identifier 97, a part identifier 98, and a life indicator 99.

The priority 95 indicates the priority of replacement of a part of the drive system. The shorter the remaining life, the higher the priority 95. Therefore, in the replacement plan list 93, the identifier 98 and the life indicator 99 of the part having the shortest remaining life are displayed at the highest level. The update date 96 indicates the date of the previous replacement of the drive system part. The drive system identifier 97 is an identifier of the slide drive systems 12a to 12d or the die cushion drive systems 32a to 32d.

The part identifier 98 is an identifier of a part included in the drive system. For example, the part identifier 98 is an identifier of the servomotor, the speed reducer, the timing belt, or the connecting rod of the slide drive systems 12a to 12d. Alternatively, it is an identifier of the servomotor, the timing belt, or the ball screw of the die cushion drive systems 32a to 32d. The server 4 displays the identifier 98 of the part determined to be the abnormal part using the determination models 60 and 70 described above in the replacement plan list 93. These identifiers may be names or codes.

The life indicator 99 indicates the remaining life of each part of the slide drive systems 12a to 12d or the die cushion drive systems 32a to 32d. The life indicator 99 includes a numerical value indicating the remaining life of each part and a graphic display. Since the life indicator 99 is the same as the life indicator 86 on the machine list screen 81 described above, the description thereof will be omitted.

The remaining life graph 94 is a graph of the remaining life of each of the drive systems 12a to 12d and 32a to 32d. The remaining life in the graph 94, the horizontal axis is the time when the state data was acquired, and the vertical axis is the remaining life calculated from the feature amount.

In the present embodiment described above, the server 4 provides the machine list screen 81 to the client computer 6 in the maintenance management service. The machine list screen 81 includes the identifier 84 of the plurality of industrial machines 2A to 2C and life indicator 86. Therefore, the user can easily grasp the priority of the maintenance targets in the plurality of industrial machines from the machine list screen 81.

Although one embodiment of the present invention has been described above, the present invention is not limited to the above embodiment, and various modifications can be made without departing from the gist of the invention. For example, the industrial machine is not limited to a press machine, but may be a welding machine or another machine such as a cutting machine. A part of the above-mentioned processing may be omitted or changed. The order of the above-mentioned processes may be changed.

The configuration of the local computers 3A to 3C may be changed. For example, the local computer 3A may include a plurality of computers. The above-mentioned processing by the local computer 3A may be distributed to a plurality of computers and executed. The local computer 3A may include a plurality of processors. The other local computers 3B and 3C may be changed in the same manner as the local computer 3A.

The configuration of the server 4 may be changed. For example, the server 4 may include a plurality of computers. The processing by the server 4 described above may be distributed to a plurality of computers and executed. The server 4 may include a plurality of processors. At least a part of the above-mentioned processing may be executed not only by the CPU but also by another processor such as a GPU (Graphics Processing Unit). The above-mentioned processing may be distributed to a plurality of processors and executed.

The determination model is not limited to the neural network, and may be another machine learning model such as a support vector machine. The determination models 61 to 64 may be integrated. The determination models 71 to 73 may be integrated. The determination of the abnormality is not limited to the determination model of artificial intelligence, and may be performed by another method.

The maintenance management screen is not limited to that of the above embodiment, and may be changed. For example, the items included in the machine list screen 81, and/or the machine individual screen 82 may be changed. The display mode of the machine list screen 81, and/or the machine individual screen 82 may be changed. The machine individual screen 82 may be omitted.

The display mode of the life indicator 86 is not limited to that of the above embodiment, and may be changed. For example, the number of color coding of the life indicator 86 may be two colors, a normal color and a first warning color. Alternatively, the number of color coding of the life indicators 86 may be more than three.

In step S105, the local computer 3A may transmit the feature amount and the analysis data to the server 4. In that case, step S203 may be omitted.

According to the present disclosure, it is possible to provide a maintenance management service that allows a user to easily grasp a priority of maintenance targets in a plurality of industrial machines.

The invention claimed is:

1. A server for displaying information about a plurality of industrial machines on a display of a client computer, the server comprising:
    a storage device that stores first data and state data indicative of states of the plurality of industrial machines, the first data being extracted from the state data;
    a processor configured to
        determine whether the first data is indicative of an abnormal condition of the plurality of industrial machines;
        determine remaining lives of the plurality of industrial machines from the state data and
        generate data indicative of a machine list screen including identifiers of the plurality of industrial machines and the remaining lives and data indicative of an individual machine screen including identifiers of a plurality of moving parts included in at least one industrial machine selected from the plurality of industrial machines; and
    a communication device configured to
        receive the first data;

transmit a request for the state data upon determining that the first data is indicative of the abnormal condition;

receive the state data responsive to the request for the state data; and output the data indicative of the machine list screen and the data indicative of the individual machine screen to the client computer via a communication network, each of the plurality of industrial machines including a motor and a plurality of drive systems, each of the plurality of drive systems including a plurality of moving parts connected to the motor, the machine list screen including the identifiers of the plurality of industrial machines, and respective identifiers and remaining lives of the plurality of drive systems of each of the plurality of industrial machines, and the individual machine screen including an identifier of the drive system including the moving part having a high replacement priority, and an identifier of the moving part having a high replacement priority and the remaining life.

2. The server according to claim 1, wherein the plurality of industrial machines are arranged in a plurality of areas, a plurality of local computers communicatively connected to each of the plurality of industrial machines are arranged in the plurality of areas, the communication device receives the first data and the state data from the plurality of local computers, and the machine list screen includes the identifiers and the remaining lives of the plurality of industrial machines arranged in the plurality of areas.

3. The server according to claim 1, wherein the machine list screen includes the remaining lives of the plurality of drive systems included in each of the plurality of industrial machines.

4. The server according to claim 3, wherein the machine list screen displays the plurality of drive systems in different colors according to the remaining lives.

5. The server according to claim 1, wherein on the machine individual screen, at least a part of the plurality of drive systems is listed in order from the one having the shortest remaining life.

6. The server according to claim 1, wherein the processor is further configured to determine from the state data the one having the shortest remaining life among the plurality of movable parts, and the machine individual screen includes the identifier and the remaining life of the movable part having the shortest remaining life.

7. A method performed by a processor to display information about a plurality of industrial machines on a display of a client computer, the method comprising:

acquiring first data, the first data being extracted from state data indicative of states of the plurality of industrial machines;

determining whether the first data is indicative of an abnormal condition of the plurality of industrial machines;

transmitting a request for the state data indicative of the states of the plurality of industrial machines upon determining the abnormal condition;

acquiring the state data indicative of the states of the plurality of industrial machines;

determining remaining lives of the plurality of industrial machines from the state data;

generating data indicative of a machine list screen including identifiers of the plurality of industrial machines and the remaining lives and data indicative of an individual machine screen including identifiers of a plurality of moving parts included in at least one industrial machine selected from the plurality of industrial machines; and outputting the data indicative of the machine list screen and the data indicative of the individual machine screen to the client computer via a communication network, each of the plurality of industrial machines including a motor and a plurality of drive systems, each of the plurality of drive systems including a plurality of moving parts connected to the motor, the machine list screen including the identifiers of the plurality of industrial machines, and respective identifiers and remaining lives of the plurality of drive systems of each of the plurality of industrial machines, and the individual machine screen including an identifier of the drive system including the moving part having a high replacement priority, and an identifier of the moving part having a high replacement priority and the remaining life.

8. The method according to claim 7, wherein the plurality of industrial machines are arranged in a plurality of areas, a plurality of local computers communicatively connected to each of the plurality of industrial machines are arranged in the plurality of areas, the acquiring the first data and the state data includes receiving the first data and the state data from the plurality of local computers, and the machine list screen includes the identifiers and the remaining lives of the plurality of industrial machines arranged in the plurality of areas.

9. The method according to claim 7, wherein the machine list screen includes the remaining lives of a plurality of drive systems included in each of the plurality of industrial machines.

10. The method according to claim 9, wherein the machine list screen displays the plurality of drive systems in different colors according to the remaining lives.

11. The method according to claim 7, wherein on the machine individual screen, at least a part of the plurality of drive systems is listed in order from the one having the shortest remaining life.

12. The method according to claim 7, wherein the processor is further configured to determine from the state data the one having the shortest remaining life among the plurality of movable parts, and the machine individual screen includes the identifier and the remaining life of the movable part having the shortest remaining life.

13. A system comprising:

a storage device that stores first data and state data indicative of states of a plurality of industrial machines, the first data being extracted from the state data;

a processor configured to determine an abnormality in the plurality of industrial machines from the first data;

determine remaining lives of the plurality of industrial machines from the state data upon determining the abnormality from the first data; and generate data indicative of a machine list screen including identifiers of the plurality of industrial machines and the remaining lives and data indicative of an individual machine screen including identifiers of a plurality of moving parts included in at least one industrial machine selected from the plurality of industrial machines; and a display that displays the machine list screen and the individual machine screen, each of the plurality of industrial machines including a motor and a plurality of drive systems, each of the plurality of drive systems including a plurality of moving parts connected to the motor, the machine list screen including the identifiers of the plurality of industrial machines, and respective identifiers and remaining lives of the plurality of drive systems of each of the plurality of industrial machines, and the individual machine screen including an identifier of the drive system including the moving part having a high replacement priority, and an identifier of the moving part having a high replacement priority and the remaining life.

\* \* \* \* \*